Patented May 19, 1931

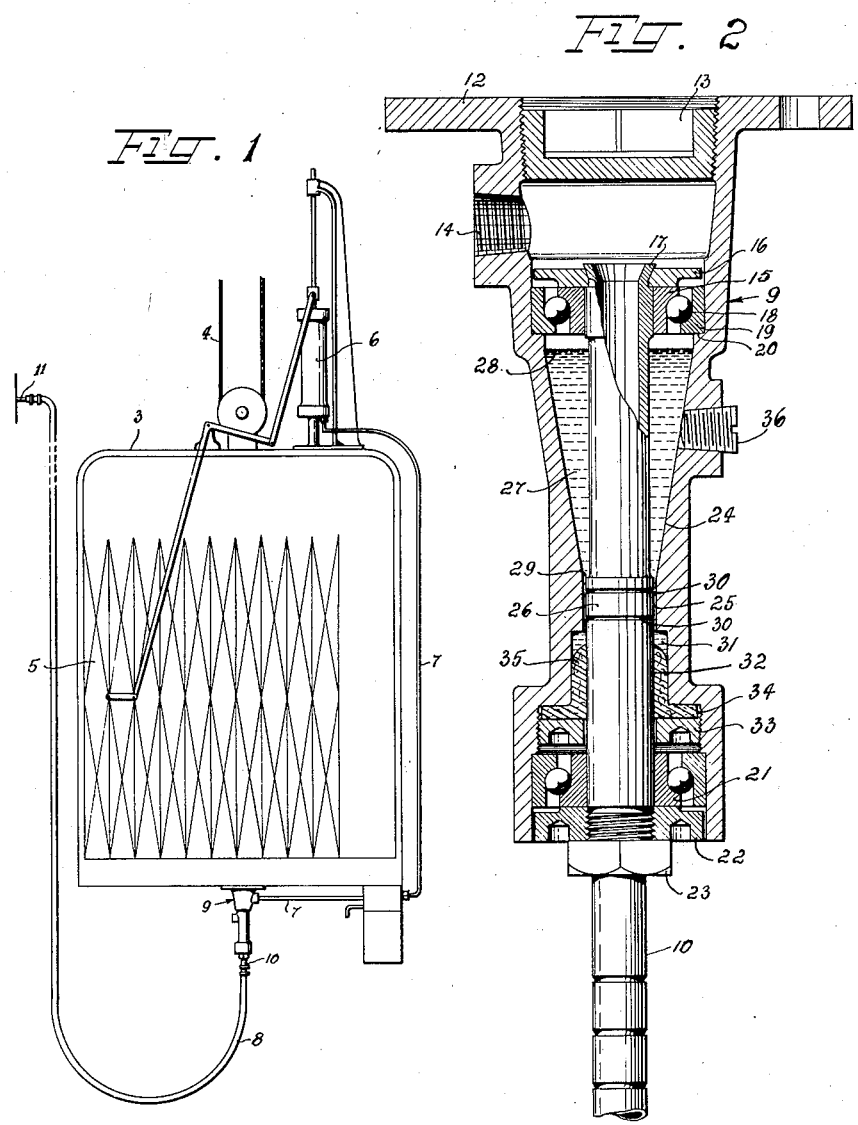

1,805,956

UNITED STATES PATENT OFFICE

HAROLD W. SHONNARD, OF UPPER MONTCLAIR, NEW JERSEY, ASSIGNOR TO ELEVATOR SUPPLIES COMPANY, INC., A CORPORATION OF NEW YORK

SWIVEL COUPLING

Original application filed August 7, 1924, Serial No. 730,765. Divided and this application filed August 21, 1928. Serial No. 301,042.

My invention relates to swivel couplings and is particularly adapted to be used in connecting a fluid pressure line on an elevator car to a source of fluid pressure in the shaftway by a flexible connection.

This is a division of my co-pending application Serial No. 730,765, filed August 7th, 1924.

Elevator cars employing fluid pressure engines to operate gates on the car or at landings must be supplied with a compressed fluid, usually air, to operate the engines. The compressed fluid is ordinarily supplied through a flexible hose having one end connected to a source of compressed fluid in the shaft and the other end connected to a pressure line on the car. A serious drawback to this arrangement has been that the hose, especially when new, has a marked tendency to kink and thrash around as the elevator travels up and down the shaftway. Frequently the kinked hose catches on some projection or drops over one of the beams between the shaftway of its car and that of the next car, in either case being severed by movement of its own car or sheared off by a passing car. Such an accident not only involves the expense of a new hose, but also the laying up of the car while the repair is being made, so that the damage from this cause is a serious matter.

Many attempts have been made to overcome this condition by building a hose which would not kink. Trials have been made of special rubber compositions, special weaves of textile fabric, and combinations of rubber and fabric, but no solution of the problem resulted as the hose still kinked enough to cause accidents. In installing a hose on a car, the hose connections to the car and in the shaft are adjusted until the kinking is reduced to a minimum, which requires much labor and many trial trips of the car with consequent trouble and expense, but even then the hose is likely to be lost, as it has proved impossible to take the kink out thoroughly except by long use.

My invention solves this problem of connection of the fluid pressure line on an elevator to the source of pressure in the shaftway, by the provision of a swivel connection in combination with any desired type of flexible hose. The connection comprises two relatively movable members so freely connected as to yield to a twist which is insufficient to kink the hose. Thus, any hose may be used regardless of tendency to kink. The connecting members are also so nearly pressure-tight that there is no material loss of pressure fluid.

By the use of my invention, the installation of a hose between an elevator car and a shaft pipe is greatly simplified, since one end of the hose may be clamped to the pipe and the other to the movable member of the swivel coupling, the base of which is preferably secured directly to the car. All the labor and expense of hose adjustment is thus avoided, as well as forced idleness of the car due to broken hose.

The structure which I employ as a pressure-tight swivel coupling is also useful wherever a stuffing box is required, since it may be modified without departing from the scope of the invention to provide a nearly frictionless, pressure-tight joint between any member mounted to slide relatively to another member, whether the movement is rotary or reciprocatory.

In the drawings

Figure 1 is a front elevation of an elevator car with hose connected, according to my invention; and Figure 2 is a longitudinal section of the invention embodied in a swivel coupling.

In Figure 1 an elevator car 3 which may be hoisted by the cable 4 has a gate 5 operated by a fluid pressure engine 6. This engine is supplied with power through pipe 7 which is connected to one end of a flexible hose 8 by a swivel coupling comprising a tubular casing 9 and a hollow spindle 10. The other end of the hose is connected to a pipe 11 at a convenient point in the shaftway, which forms part of a pressure line leading from a source of fluid pressure, such as an air tank.

The flexible connection selected for a detailed description is intended to be carried on the bottom of an elevator car, and consists, as shown in Figure 2, of the tubular casing 9 and the hollow spindle 10 mounted for rotation within the casing. In casting the casing I preferably provide a flange 12 as a supporting base. For ease in casting and assembling the parts, the upper end of the casing may be closed by a screw-threaded plug 13, while an outlet 14 may receive the car pipe 7 to which pressure is supplied from the hose clamped to the lower end of spindle 10. The spindle must be mounted for rotation in the casing with as little friction as possible, so that any torsional stress arising in the hose which might cause a kink will instead be converted into rotation of the spindle to relieve the stress. I therefore preferably employ two radial thrust ball bearings, one near the top of the spindle and the other near the lower end of the casing. The upper bearing consists of an inner race 15 fitting snugly about the spindle and having a thrust collar 16 held against it by the end of the spindle which is riveted over at 17. Balls 18 carry the inner race on an outer race 19 which is supported in the casing as by a shoulder 20. The lower bearing is of similar construction with an inner race 21 held on the spindle by a nut 22 and lock nut 23. This bearing arrangement permits the spindle to carry the weight of the hose and yet to rotate in response to very small twisting force.

To provide a pressure-tight joint between the casing and spindle, my invention employs a tapered chamber, which in the present instance is formed just below the upper bearing by the converging of the casing walls at 24 to a reduced neck portion 25 which is carefully machined to provide a slight clearance for the likewise machined portion 26 of the spindle. In practice I have found that a clearance in the neighborhood of .005 of an inch works satisfactorily and may be produced without excessive expense in machining the parts. The tapered chamber 27 is filled with a very heavy lubricant, preferably "Albany" grease, which is of such heavy body as to form in effect a viscosity intensifying piston. The clearance between thrust collar 16 and the interior of the casing and between the balls of the bearing is sufficient to expose the upper closed end of the casing. The area of the large end 28 of the piston is many times greater than that of the smaller end 29 at the bottom of the tapered chamber, so that lubricant is much denser between the spindle and casing at said lower end.

As a result of the conical shape of the chamber a small movement of the upper surface of the grease piston would result in a very much greater movement of the lower surface between the spindle and the casing. Thus, a comparatively large pressure on the top of the conical piston would be required to overcome a relatively small viscosity or resistance to deformation at the lower end.

In practice I have found that line pressures up to sixty pounds per square inch cannot penetrate the lubricant piston when the area of its larger end is between 100 and 200 times as great as that of the clearance space between the spindle and casing at the lower end of the tapered chamber. The pressure on the grease at the clearance requires a positive means to hold back such of the lubricant which would otherwise slowly ooze through the clearance, thus causing a loss of grease and an ultimate breaking of the seal. I have found that this may be accomplished without affecting the swiveling tendency by employing as a packing a cupped washer 32 having a lip 34 which may be compressed against a shoulder on the casing by a gland nut 33. Preferably I bevel the upper edge of the washer, as at 35, so that grease coming from the clearance space will tend to force the packing tightly against the spindle. The spindle may also advantageously be provided with grooves 30 to aid in retaining the grease.

While the invention has been described in connection with a swivel coupling particularly adapted for use in connecting an air hose to an elevator car, the tapered viscosity intensifying chamber and packing washer may also be used to make a pressure-tight joint wherever a stuffing box is necessary, since it is obviously unimportant whether the inner movable member is a hollow spindle or a solid rod, and the sealing effect created by the tapered chamber is the same whether the inner member is mounted to reciprocate relative to the casing or to rotate relative thereto, as in the construction above described. In cases of reciprocatory movement it may be desirable to provide two tapered chambers facing in opposite directions with auxiliary pressure acting on the larger ends of the pressure intensifying lubricant pistons. Other modifications within the spirit of the invention will be suggested to those skilled in the art by the foregoing description.

Claims:

1. In combination, a tubular casing connected to a pressure line, a member within said casing having a cylindrical outer surface, a mass of lubricating material between the member and the casing having one end exposed to the line pressure, said casing being wider at said end than at the opposite end whereby said mass of lubricating material is adapted to multiply the resistance to deformation of the lubricant at the end opposite to that exposed to the line pressure, and a packing between the member and the casing to prevent the escape of compressed lubricant.

2. In combination, a tubular casing connectable with a pressure line, a spindle mounted for rotation within the casing, the inner wall of the casing converging from near the pressure line connection until it just clears the spindle, the tapered chamber thus formed containing lubricant sufficiently solid to intensify the line pressure, a cupped packing washer on the spindle beyond the clearance, and a gland member to hold the washer against the casing to prevent escape of the lubricant.

3. In combination, a tubular casing closed at one end having a reduced neck portion intermediate its ends, a hollow spindle extending into the casing with a very small clearance at the neck, the outer wall of the spindle and the inner wall of the casing diverging on one side of the neck towards the closed end of the casing to form a tapered grease chamber whose larger end is in communication with the open inner end of the spindle, a packing chamber between the spindle and casing on the other side of the neck, a gland to hold packing in the chamber, and bearings to support the spindle for movement relative to the casing.

4. A coupling comprising a vertically moving but non-rotatable tubular casing, a spindle swiveled in said casing, adapted to be rigidly connected to a flexible compressed air conducting hose whereby the slightest torsional strain set up in said hose by the propelled air causes rotation of said spindle and is thus absorbed before any kinking of the hose can occur, and means for preventing the loss of any appreciable amount of pressure as the air passes through said coupling, comprising a conical chamber exposed to the full pressure of the propelled air at its widest portion and having its narrowest portion adjacent the lower end of said spindle.

Signed at Hoboken, in the county of Hudson and State of New Jersey, this 20th day of August, A. D. 1928.

HAROLD W. SHONNARD.